US007739698B2

(12) United States Patent
Branda et al.

(10) Patent No.: US 7,739,698 B2
(45) Date of Patent: Jun. 15, 2010

(54) MULTIPLATFORM API USAGE TOOL

(75) Inventors: Steven J. Branda, Rochester, MN (US);
Robert V. Geiner, Raleigh, NC (US);
John J. Stecher, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 1056 days.

(21) Appl. No.: 11/440,959

(22) Filed: May 25, 2006

(65) Prior Publication Data

US 2007/0288897 A1 Dec. 13, 2007

(51) Int. Cl.
*G11C 29/00* (2006.01)
*G01R 31/28* (2006.01)
(52) U.S. Cl. .............................. 719/328; 714/48; 714/57
(58) Field of Classification Search ................... 762/22; 707/100; 709/223
See application file for complete search history.

(56) References Cited

U.S. PATENT DOCUMENTS

| 6,370,682 | B1 | 4/2002 | Eckardt et al. ................. 717/1 |
| 6,662,312 | B1 | 12/2003 | Keller et al. ................... 714/38 |
| 7,418,426 | B1 * | 8/2008 | Reunert et al. ................ 705/40 |
| 2002/0133752 | A1 | 9/2002 | Hand ........................... 714/38 |
| 2003/0055868 | A1 | 3/2003 | Fletcher et al. ............. 709/201 |
| 2003/0074423 | A1 | 4/2003 | Mayberry et al. ........... 709/219 |
| 2004/0015812 | A1 | 1/2004 | Sreedhar ...................... 717/100 |
| 2004/0133875 | A1 | 7/2004 | Kramer ....................... 717/101 |
| 2004/0168152 | A1 | 8/2004 | Kramer ....................... 717/120 |
| 2004/0220952 | A1 * | 11/2004 | Cheenath .................... 707/100 |
| 2004/0268302 | A1 | 12/2004 | Srivastava et al. ........... 717/108 |
| 2005/0149935 | A1 * | 7/2005 | Benedetti .................... 718/102 |
| 2005/0246773 | A1 * | 11/2005 | Draine et al. ................. 726/22 |

* cited by examiner

*Primary Examiner*—Hyung S Sough
*Assistant Examiner*—Tuan Dao
(74) *Attorney, Agent, or Firm*—Lee Law, PLLC; Christopher B. Lee

(57) ABSTRACT

The "API Usage Tool" (AUT) comprises an Interactive Developer Environment Plug-in (IDEP) and a Web Service Component (WSC). The IDEP opens the source code file containing API method calls, identifies the API method calls in the source code, and saves the identified API method calls to an API usage log. The WSC searches API usage data sheets for usage, best practices and known bugs for each identified API method call. The WSC generates an API usage compilation based on the identified API method calls. The IDEP compares the API usage compilation to the dynamic data in the usage log, looking for conflicts between the compiled usage and the actual usage in the source code. The IDEP marks any API method calls in the source code that do not comport with the compiled usage guidelines.

12 Claims, 4 Drawing Sheets

EXAMPLE ENTRY FROM API USAGE LOG 240

| METHOD CALL ID | 3 |
|---|---|
| DYNAMIC DATA | exampleAPIClassInstance.setCache(256) |
| STATIC DATA | exampleAPIClass.setCache(arg) |

FIG. 5

EXAMPLE LISTING FROM API USAGE COMPILATION 270

| METHOD ID | 3 |
|---|---|
| CLASS | exampleAPIClass |
| METHOD | setCache |
| ARGUMENT INFO | Integer |
| ARGUMENT CONDITIONS | Argument > 128: Cache sizes greater than 128 bytes will cause "out of memory error" |

FIG. 6

MULTIPLATFORM API USAGE TOOL

FIELD OF THE INVENTION

The invention relates generally to electrical computers and digital data processing, and specifically to testing program code for the purpose of locating and correcting errors during software development.

BACKGROUND OF THE INVENTION

Developers write application code that runs on Web Service platforms. Web Service platforms are self-contained, modular applications that can be described, published, located, and invoked over a network such as the World Wide Web. Web Service platforms are provided by different vendors, such as IBM®, MICROSOFT® or SUN MICROSYSTEMS®, that generally use a standardized Application Programming Interface (API) such as J2EE. API method calls contain both dynamic and static information. Dynamic data includes specific information such as argument values and return assignment usage. The dynamic data is specific to the developer's code and may contain sensitive information. Static data includes more generic information such as the method name and argument types.

Although API method calls are standardized, usage rules and known bugs may vary between different vendor's Web Service platforms. Web Service platform vendors make information regarding API usage, best practices and known bugs for their web service platform available in published API usage data sheets.

Developers strive to write code that is compatible on multiple vendors' Web Service platforms. To ensure portability across multiple platforms, developers must test their code for compatibility with each vendor's Web Services. In order to test their codes for compatibility, developers need access to each of the Web Services platform for which compatibility is sought. Testing code on multiple Web Service platforms is time consuming and can be expensive if the developer must pay for access to each vendor's Web Services.

Therefore, a need exists for a developer's tool that can automatically test code against API usage data sheets published on multiple Web Service platforms at one time.

SUMMARY OF THE INVENTION

The invention meeting the need identified above is the "API Usage Tool" (AUT). The AUT has two components, an Interactive Developer Environment Plug-in (IDEP) and a Web Service Component (WSC). The IDEP runs locally as an online application on a computer used by an application developer to write or test code. The WSC runs on a vendor's Web Service platform and uses published API Usage Data Sheets that provide data related to API usage, best practices and known bugs for each platform. The IDEP opens the source code file containing API method calls, identifies the API method calls in the source code, and saves the identified API method calls to an API usage log. The IDEP transmits the identified API method calls to the WSC. In the preferred embodiment of the AUT, only the static data for each API method call is transmitted to the WSC. Sending only the static data prevents the Web Service vendor from receiving confidential information. The WSC receives the transmission from the AUT and searches the API usage data sheets for usage, best practices and known bugs for each identified API method call. The WSC generates an API usage compilation based on the identified API method calls and sends the API usage compilation to the AUT. The IDEP compares the API usage compilation to the dynamic data in the usage log, looking for conflicts between the compiled usage and the actual usage in the source code. The IDEP marks any API method calls in the source code that do not comport with the compiled usage guidelines.

BRIEF DESCRIPTION OF DRAWINGS

The novel features believed characteristic of the invention are set forth in the appended claims. The invention itself, however, as well as a preferred mode of use, further objectives and advantages thereof, will be understood best by reference to the following detailed description of an illustrative embodiment when read in conjunction with the accompanying drawings, wherein:

FIG. 5. depicts a sample API usage log listing.

FIG. 6. depicts a sample API usage compilation listing.

DETAILED DESCRIPTION OF THE PREFERRED EMBODIMENT

The principles of the present invention are applicable to a variety of computer hardware and software configurations. The term "computer hardware" or "hardware," as used herein, refers to any machine or apparatus that is capable of accepting, performing logic operations on, storing, or displaying data, and includes without limitation processors and memory; the term "computer software" or "software," refers to any set of instructions operable to cause computer hardware to perform an operation. A "computer," as that term is used herein, includes without limitation any useful combination of hardware and software, and a "computer program" or "program" includes without limitation any software operable to cause computer hardware to accept, perform logic operations on, store, or display data. A computer program may, and often is, comprised of a plurality of smaller programming units, including without limitation subroutines, modules, functions, methods, and procedures. Thus, the functions of the present invention may be distributed among a plurality of computers and computer programs. The invention is described best, though, as a single computer program that configures and enables one or more general-purpose computers to implement the novel aspects of the invention. For illustrative purposes, the inventive computer program will be referred to as the "API Usage Tool" (AUT).

Figure 1:
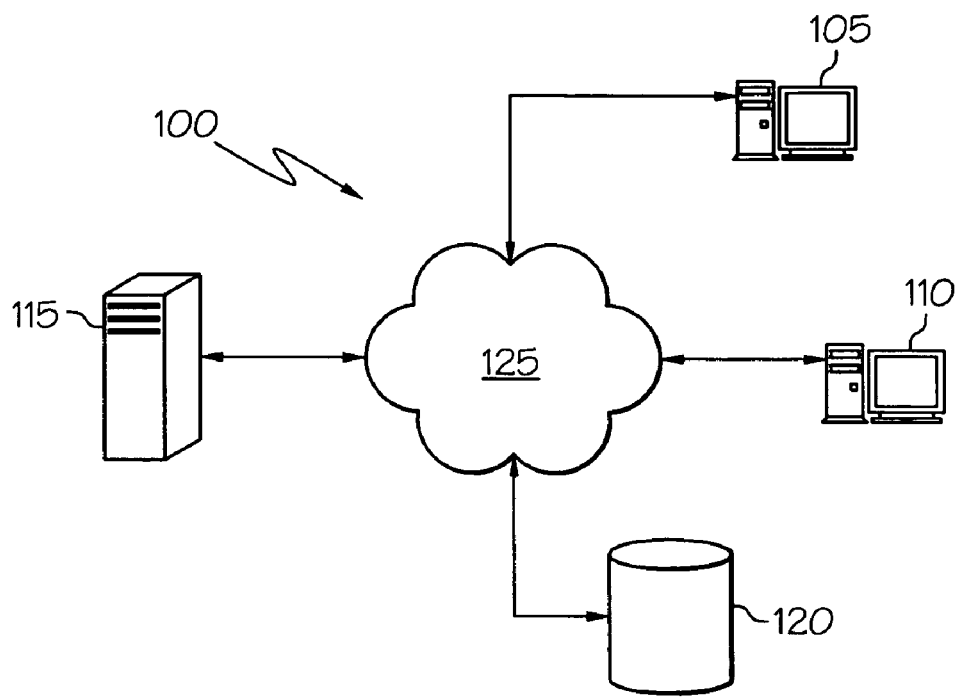
FIG. 1. depicts an exemplary computer network.

Additionally, the AUT is described below with reference to an exemplary network of hardware devices, as depicted in FIG. 1. A "network" comprises any number of hardware devices coupled to and in communication with each other through a communications medium, such as the Internet. A "communications medium" includes without limitation any physical, optical, electromagnetic, or other medium through which hardware or software can transmit data. For descriptive purposes, exemplary network 100 has only a limited number of nodes, including workstation computer 105, workstation computer 110, server computer 115, and persistent storage 120. Network connection 125 comprises all hardware, software, and communications media necessary to enable communication between network nodes 105-120. Unless otherwise indicated in context below, all network nodes use publicly available protocols or messaging services to communicate with each other through network connection 125.

Figure 2:
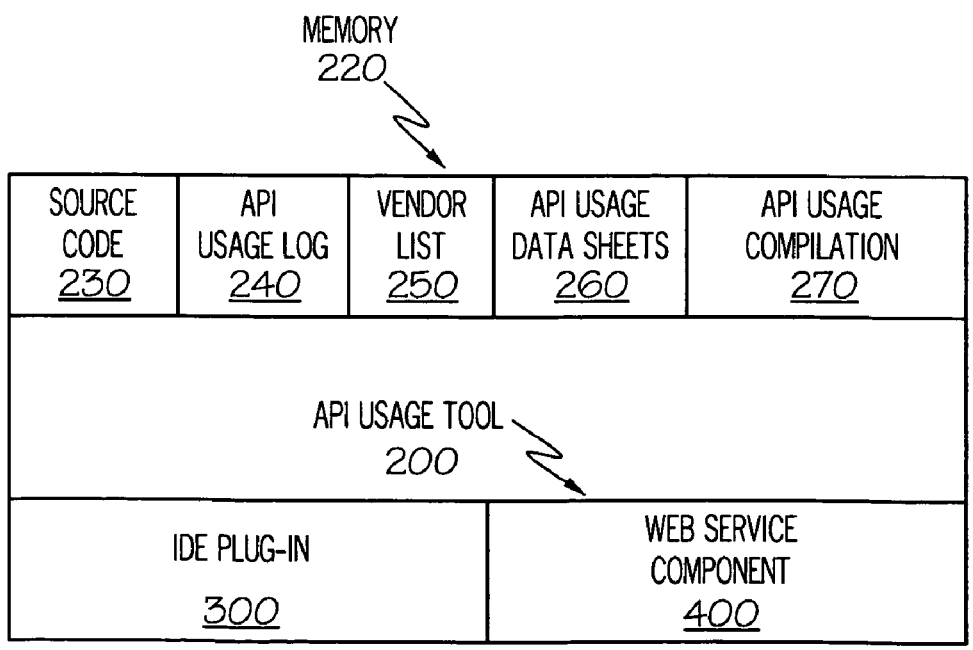
FIG. 2. depicts programs and files in a memory on a computer.

AUT 200 typically is stored in a memory, represented schematically as memory 220 in FIG. 2. The term "memory," as used herein, includes without limitation any volatile or persistent medium, such as an electrical circuit, magnetic disk, or optical disk, in which a computer can store data or software for any duration. A single memory may encompass and be distributed across a plurality of media. Further, AUT 200 may reside in more than one memory distributed across different computers, servers, logical partitions or other hardware devices. The elements depicted in memory 220 may be located in or distributed across separate memories in any combination, and AUT 200 may be adapted to identify, locate and access any of the elements and coordinate actions, if any, by the distributed elements. Thus, FIG. 2 is included merely as a descriptive expedient and does not necessarily reflect any particular physical or logical embodiment of memory 220. AUT 200 comprises an Interactive Developer Environment Plug-in (IDEP) 300 and Web Service Component (WSC) 400. As depicted in FIG. 2, though, memory 220 may include additional data and programs. Of particular import to AUT 200, memory 220 may include source code 230, API usage log 240, vendor list 250, API usage data sheets 260 and API usage compilation 270 with which AUT 200 interacts.

Figure 3:
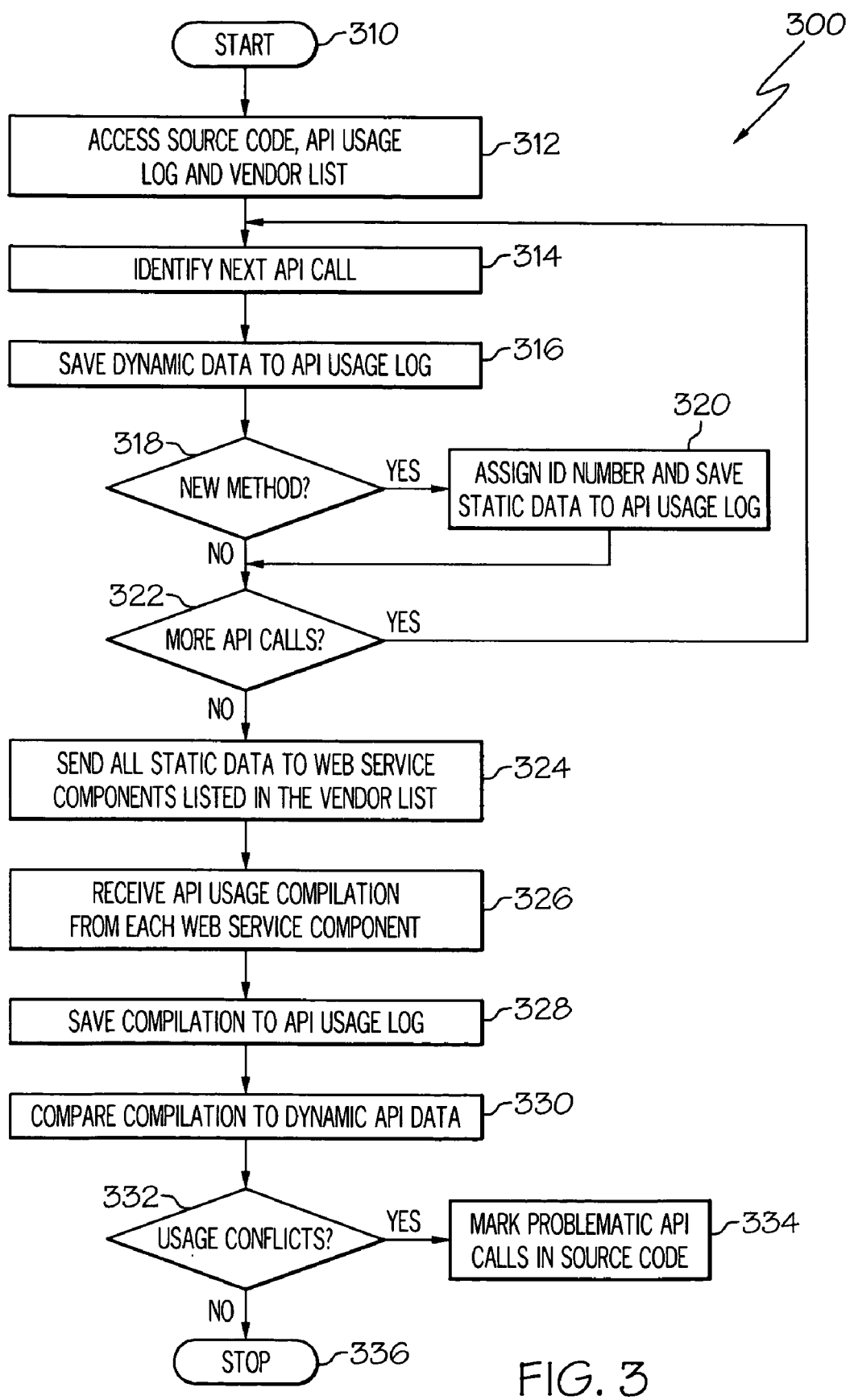
FIG. 3. depicts a flowchart of the logic of the IDE Plug-in (IDEP).

FIG. 3 depicts a flowchart of the logic of Interactive Developer Environment Plug-in (IDEP) 300. IDEP 300 starts (310) by accessing source code 230, API usage log 240, and API usage compilation 270 (312). IDEP 300 identifies the next API call in the source code (314), and saves dynamic data to API usage log 240 (316). IDEP 300 determines whether the API call saved in step 314 is a new method, or has appeared previously in source code 230 (318). If the API call is new, the static data is extracted from the dynamic API call saved to API usage log 240 (320). If there are more API calls in source code 230 (322), IDEP 300 repeats the steps of identifying and saving both the dynamic and static data for each API call (314-320). Once all the API method calls have been logged, IDEP 300 sends all the static data from API usage log 240 to every vendor's Web Service Component (WSC) 400 listed in vendor list 250 (324). Each WSC 400 returns a different API Usage Compilation 270 with a list of usage, best practices and known bugs for each identified API method call (326). IDEP 300 saves the information from each API Usage Compilation 270 to API Usage Log 240 (328), and compares the compilation data to the dynamic API data from source code 230 (330). If IDEP 300 identifies usage conflicts between the dynamic API method calls in source code 230 and the compile usage data from WSC 400 (332), IDEP 300 marks problematic API method calls in source code 230 (334). IDEP 300 could indicate problematic API calls directly in source code 230, or open an editor or other window to display the problematic API calls. After marking any problematic API method calls, IDEP 300 stops (336).

Figure 4:
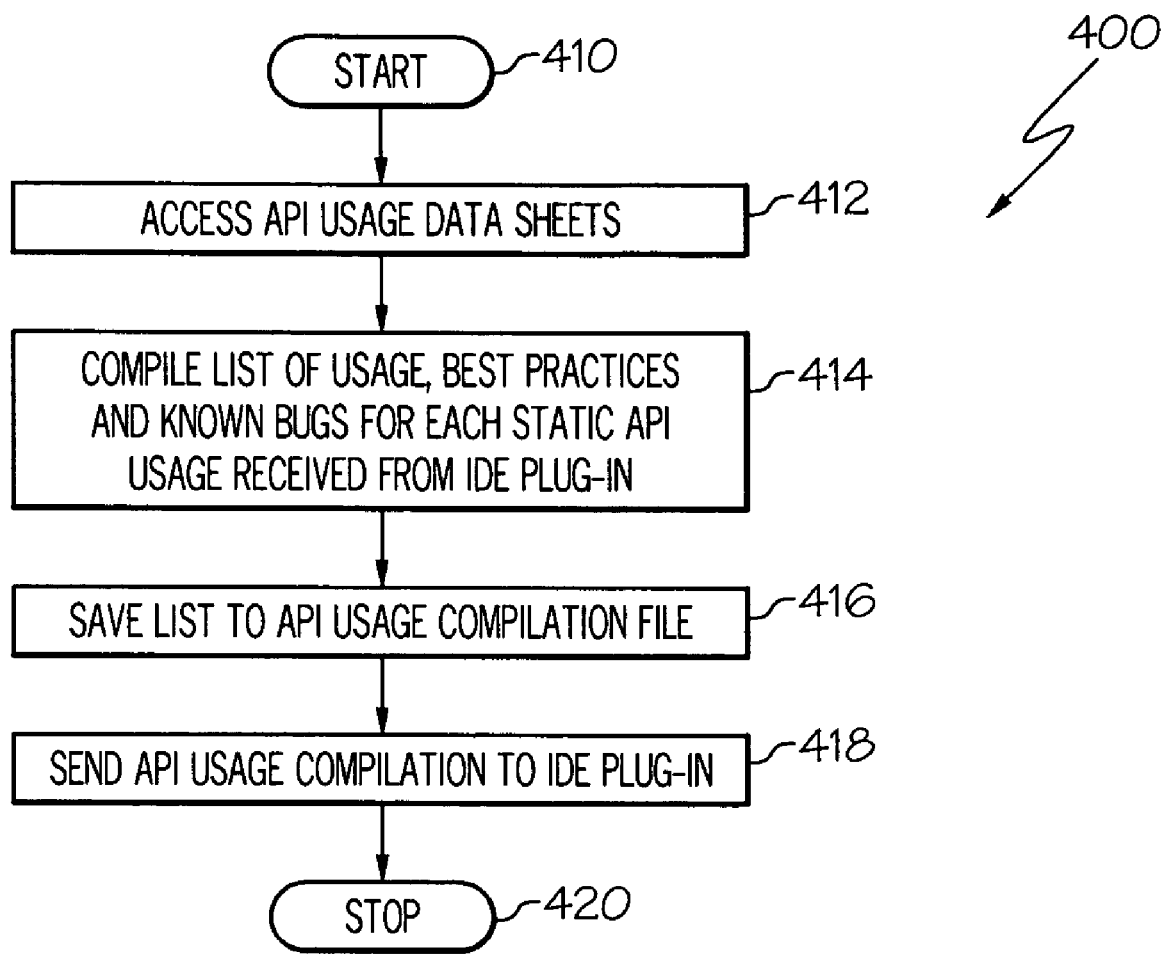
FIG. 4. depicts a flowchart of a Web Service Component (WSC).

FIG. 4 depicts a flowchart of Web Service Component (WSC) 400. WSC 400 starts when it receives a list of static API method calls from IDEP 300 (410). WSC 400 accesses API Usage Data Sheets 260 (412) and compiles a list of usage, best practices and known bugs from the data sheets for every received static API method call (414). WSC 400 saves the compiled list to API Usage Compilation 270 (416), sends API Usage Compilation 270 to IDEP 300 (418) and stops (420).

FIG. 5 depicts a sample entry from API usage log 240 The sample entry from API usage log 240 contains both the dynamic API method call with specific data from the source code, and the static API method call with the specific information removed.

FIG. 6 depicts a sample entry from API usage compilation 270 that corresponds to the sample entry from API usage log 240 depicted in FIG. 5. The sample entry from API usage compilation 270 contains usage information which IDEP 300 compares to the sample entry for API usage log 240. In this case, the return value assignment of 256 in the dynamic API method call data exceeds the argument condition of 128 from the API usage compilation, and will result in an error. Therefore, after comparing the API usage compilation to the dynamic API method call data, IDEP 300 will identify this method call as problematic in the code window.

A preferred form of the invention has been shown in the drawings and described above, but variations in the preferred form will be apparent to those skilled in the art. The preceding description is for illustration purposes only, and the invention should not be construed as limited to the specific form shown and described. The scope of the invention should be limited only by the language of the following claims.

What is claimed is:

1. A computer implemented process, comprising:
   identifying application program interface (API) calls in a source code file, each of the API calls comprising dynamic data;
   determining which of the API calls are new calls;
   extracting static data from the dynamic data for each of the new calls;
   receiving a usage compilation compiled from the static data and comprising usage information, best practices and known bugs for each of the new calls;
   identifying usage conflicts between the dynamic data for each of the API calls, and the usage information, the best practices and the known bugs for a corresponding one of the new calls in the usage compilation; and
   marking each of the API calls in the source code file that include one of the usage conflicts.

2. The computer implemented process of claim 1 where the usage compilation is received from multiple web service components representing different web service vendors.

3. The computer implemented process of claim 1 further comprising:
   sending the static data to a web services platform; and
   receiving the usage compilation from the web services platform.

4. The computer implemented process of claim 3 where the static data comprises generic and non-sensitive information, the dynamic data comprises sensitive information including arguments for the API calls, and the dynamic data is not transmitted to the web services platform.

5. An apparatus, comprising:
   a memory; and
   a processor, programmed to:
      identify application program interface (API) calls in a source code file, each of the API calls comprising dynamic data;
      determine which of the API calls are new calls;
      extract static data from the dynamic data for each of the new calls;
      receive a usage compilation compiled from the static data and comprising usage information, best practices and known bugs for each of the new calls;
      identify usage conflicts between the dynamic data for each of the API calls, and the usage information, the best practices and the known bugs for a corresponding one of the new calls in the usage compilation; and mark each of the API calls in the source code file that include one of the usage conflicts.

6. The apparatus of claim 5 where the usage compilation is received from multiple web service components representing different web service vendors.

7. The apparatus of claim 5 where the processor is further programmed to:
send the static data to a web services platform; and
receive the usage compilation from the web services platform.

8. The apparatus of claim 7 where the static data comprises generic and non-sensitive information, the dynamic data comprises sensitive information including arguments for the API calls, and the dynamic data is not transmitted to the web services platform.

9. A computer program product comprising a computer readable storage medium including computer readable program code, where the computer readable program code when executed on a computer causes the computer to:
identify application program interface (API) calls in a source code file, each of the API calls comprising dynamic data;
determine which of the API calls are new calls;
extract static data from the dynamic data for each of the new calls;
receive a usage compilation compiled from the static data and comprising usage information, best practices and known bugs for each of the new calls;
identify usage conflicts between the dynamic data for each of the API calls, and the usage information, the best practices and the known bugs for a corresponding one of the new calls in the usage compilation; and
mark each of the API calls in the source code file that include one of the usage conflicts.

10. The computer program product of claim 9 where the usage compilation is received from multiple web service components representing different web service vendors.

11. The computer program product of claim 9 where the computer readable program code when executed on the computer further causes the computer to:
send the static data to a web services platform; and
receive the usage compilation from the web services platform.

12. The computer program product of claim 11 where the static data comprises generic and non-sensitive information, the dynamic data comprises sensitive information including arguments for the API calls, and the dynamic data is not transmitted to the web services platform.

\* \* \* \* \*